United States Patent [19]
Terashima et al.

[11] Patent Number: 5,807,499
[45] Date of Patent: Sep. 15, 1998

[54] LIQUID CRYSTAL COMPOSITION AND A LIQUID CRYSTAL DISPLAY DEVICE CONTAINING THE SAME

[75] Inventors: Kanetsugu Terashima; Hitoshi Yamamoto; Hiroaki Kawashukuda, all of Shigaken, Japan

[73] Assignee: Chisso Corporation, Osaka, Japan

[21] Appl. No.: 697,169

[22] Filed: Aug. 20, 1996

[51] Int. Cl.$^6$ .......................... C09K 19/30; C09K 19/32; C09K 19/12; C09K 00/20
[52] U.S. Cl. ............... 252/299.63; 252/299.62; 252/299.65; 252/299.66; 252/299.67
[58] Field of Search .................. 252/299.63, 299.66, 252/299.67, 299.62, 299.65

[56] References Cited

U.S. PATENT DOCUMENTS

| | | | |
|---|---|---|---|
| 4,801,756 | 1/1989 | Kano et al. | 568/642 |
| 5,114,614 | 5/1992 | Emoto et al. | 252/299.65 |
| 5,439,613 | 8/1995 | Takeshita et al. | 252/299.63 |
| 5,458,805 | 10/1995 | Wachtler et al. | 252/299.63 |
| 5,582,766 | 12/1996 | Jeon | 252/299.62 |

*Primary Examiner*—C. H. Kelly
*Attorney, Agent, or Firm*—Wenderoth, Lind & Ponack, L.L.P.

[57] ABSTRACT

A liquid crystal material for a STN display device having a low viscosity, steep electro-optical response characteristics, and a small temperature dependence of a threshold voltage is provided by a LC composition comprising:

- at least one first optically active compound having a negative temperature dependence of cholesteric helical pitch induced when added singly to a nematic liquid crystal and
- at least one second optically active compound having the same helical sense to the first optically active compound and a positive temperature dependence of a cholesteric helical pitch induced when added singly to a nematic liquid crystal,
- characterized in that the composition has a helical pitch at 25° C. of 6–15 μm, a negative temperature dependence of a helical pitch and a rate of change of a helical pitch of −0.05 to 0 μm/° C. between 10° and 50° C.

2 Claims, No Drawings

LIQUID CRYSTAL COMPOSITION AND A LIQUID CRYSTAL DISPLAY DEVICE CONTAINING THE SAME

BACKGROUND OF THE INVENTION

Field of the Invention

This invention relates to a liquid crystal composition for a LC display device and to a liquid crystal display device containing the composition. More specifically, the present invention relates to a nematic liquid crystal composition for a super-twisted nematic mode display which has been improved in a temperature dependence of a threshold voltage, and also to a liquid crystal display device employing this composition. 2. Description of the Related Art According to recent development in information instruments, especially in portable terminal devices, there has been increased demand for a small and thin-shaped display device having a small power consumption, which device has as large display capacity with high display quality as that of a cathode ray tube (CRT). Following the demand a super-twisted nematic (STN) display mode is mainly employed as liquid crystal display. This STN mode was presented in 1984 by T. J. Scheffer et al., and is innovative in that the mode has made a great improvement on the conventional twisted nematic (TN) display mode employing a twist angle of 90 degrees. It was reported that the STN display mode has brought about a far better contrast and a wider viewing angle than the conventional TN mode by applying a birefringence effect of a display cell employing a twist angle between 180–270 degrees. It was also reported that the display quality was maintained even when a duty ratio for multiplex drive was decreased e.g. to 1/480 (Refer to T. J. Scheffer et al.: Appl. Phys. Lett., 45,(1984), pp. 1021).

However, the STN display mode has not yet solved an important problem of poor display quality due to unevenness in the display caused by a temperature difference in the display surface which was derived from local heat of backlight on the display surface, although the STN display mode has satisfied superior display quality of a high contrast and a wide viewing angle. This poor display quality is much affected with a temperature change of a threshold voltage. The problem is believed to be solved by controlling a temperature dependence of a threshold voltage (1) by employing a LC material having a high clearing point or (2) by using a LC material containing a small amount of dielectrically positive compounds with choosing dielectrically highly positive compounds. However, even such an improved LC material as proposed above shows a temperature dependence of a threshold voltage as considerably large as 50 mV/° C. or larger, which results in poor display quality on account of an ambient temperature change.

Japanese patent application laid-open No. 63-22893 discloses that a temperature dependence of a threshold voltage may be reduced by adding to a LC material two or more optically active compounds producing different signs of temperature dependence of a helical pitch when added singly to the LC material. The document discloses an improvement in temperature dependence of a threshold voltage in TN display mode wherein a twist angle of 90 degrees is employed, and an improvement of maintaining a definite intrinsic helical pitch ($P_O$) of a STN display mode wherein a twist angle of 180–270 degrees is employed. However, the document neither teaches nor suggests how to improve the temperature dependence of the threshold voltage in the STN display mode.

At present a temperature dependence of a threshold voltage of a liquid crystal material for the STN mode display is desired to be 35 mV/° C. or lower, preferably not higher than 20 mV/° C. Various LC materials have been attempted for the STN display mode, however, it was difficult to provide a LC composition which satisfies a temperature dependence of the threshold voltage in the STN mode.

SUMMARY OF THE INVENTION

An object of the present invention is to provide a STN mode display device and a liquid crystal composition for the STN display mode which satisfies a high contrast display with rapid electrooptical response, low temperature dependence of a threshold voltage, good display quality without any unevenness, and such properties as described above.

The present invention is based on the findings that a temperature dependence of a LC composition may be reduced by adding thereto a small amount of a mixture comprising:

(a) at least one optically active compound having a negative temperature dependence of a helical pitch; and (b) at least one optically active compound having the same helical sense as that of the above optically active compound and a positive temperature dependence of a helical pitch, thereby to optimize a temperature dependence of a helical pitch of the LC composition.

The present invention resides in subject matter described in the following items (1) through (10).

(1) A liquid crystal composition for a super-twisted nematic mode display device comprising:

at least one first optically active compound having a negative temperature dependence of a cholesteric helical pitch induced when added singly to a nematic liquid crystal and at least one second optically active compound having the same helical sense to the first optically active compound and a positive temperature dependence of a cholesteric helical pitch induced when added singly to a nematic liquid crystal, characterized in that the composition has a helical pitch at 25° C. of 6 to 15 μm, a negative temperature dependence of a helical pitch and a rate of change of a helical pitch of −0.05 μm/° C. to 0 μm/° C. between 10° C. and 50° C.

(2) A liquid crystal composition according to above item (1), wherein the first optically active compound is selected from the group consisting of compounds having a partial structure expressed by general formula (I) and the second optically active compound is selected from the group consisting of compounds having a partial structure expressed by any one of general formulas (II), (III) and (IV):

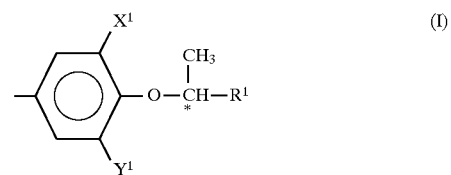

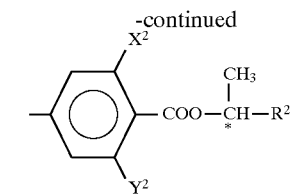
(II)

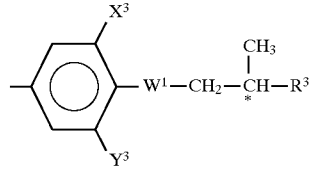
(III)

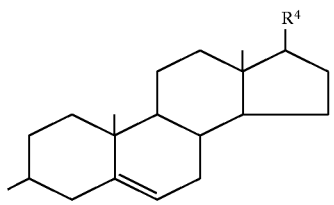
(IV)

wherein, in formula (I), $R^1$ represents an alkyl group of 2–10 carbon atoms; and $X^1$ and $Y^1$ each represent independently a hydrogen atom, a halogen atom or a cyano group;

in formula (II), $R^2$ represents an alkyl group of 2–10 carbon atoms; and $X^2$ and $Y^2$ each represent independently a hydrogen atom, a halogen atom or a cyano group;

in formula (III), $R^3$ represents an alkyl group of 2–10 carbon atoms; $W^1$ represents a single bond, —O— or —COO—; and $X^3$ and $Y^3$ each represent independently a hydrogen atom, a halogen atom or a cyano group; and in formula (IV), $R^4$ represents a hydrogen atom or an alkyl group of 1–10 carbon atoms.

(3) A liquid crystal composition according to above item (2), wherein the first optically active compound is selected from the group consisting of compounds expressed by general formula (I-a) and the second optically active compound is selected from the group consisting of compounds expressed by any one of general formulas (II-a), (III-a) and (IV-a):

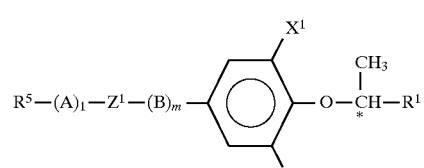
(I-a)

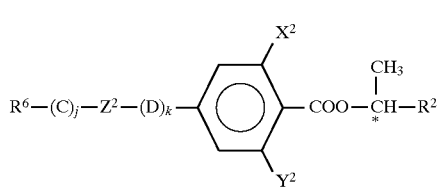
(II-a)

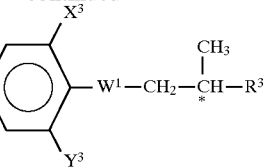
(III-a)

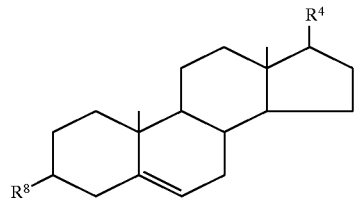
(IV-a)

wherein, in formula (I-a), A and B each represent independently a benzene ring, a cyclohexane ring, a dioxane ring, a pyrimidine ring, a pyridine ring, a pyridazine ring or a pyrazine ring; 1 and m each represent an integer of 0, 1 or 2, and (1+m) is 1 to 3; $Z^1$ represents a single bond, —COO—, —OCO—, —$CH_2O$—, —$OCH_2$—, —$CH_2CH_2$—, —CH=N— or —N=CH—; $R^1$ represents an alkyl group of 2–10 carbon atoms; $R^5$ represents an alkyl group or an alkoxy group each of 1–10 carbon atoms, a halogen atom or a cyano group; and $X^1$ and $y^1$ represent independently a hydrogen atom, a halogen atom or a cyano group;

in formula (II-a), C and D each represent independently a benzene ring, a cyclohexane ring, a dioxane ring, a pyrimidine ring, a pyridine ring, a pyridazine ring or a pyrazine ring; j and k each represent an integer of 0, 1 or 2, and (j+k) is 1 to 3; $Z^2$ represents a single bond, —COO—, —OCO—, —$CH_2O$—, —$OCH_2$—, —$CH_2CH_2$—, —CH=N— or —N=CH—; $R^2$ represents an alkyl group of 2–10 carbon atoms; $R^6$ represents an alkyl group or an alkoxy group each of 1–10 carbon atoms, a halogen atom or a cyano group; and $X^2$ and $y^2$ represent independently a hydrogen atom, a halogen atom or a cyano group;

in formula (III-a), E and F each represent independently a benzene ring, a cyclohexane ring, a dioxane ring, a pyrimidine ring, a pyridine ring, a pyridazine ring or a pyrazine ring; h and i each represent an integer of 0, 1 or 2, and (h+i) is 1 to 3; $Z^3$ represents a single bond, —COO—, —OCO—, —$CH_2O$—, —$OCH_2$—, —$CH_2CH_2$—, —CH=N— or —N=CH—; $R^3$ represents an alkyl group of 2–10 carbon atoms; $R^7$ represents an alkyl group or an alkoxy group each of 1–10 carbon atoms, a halogen atom or a cyano group; $W^1$ represents a single bond, —O— or —COO—; and $X^3$ and $y^3$ represent independently a hydrogen atom, a halogen atom or a cyano group;

in formula (IV-a), $R^4$ represents a hydrogen atom or an alkyl group of 1–10 carbon atoms; and $R^8$ represents a hydrogen atom, a halogen atom, a cyano group, or an alkyl group, an alkoxy group, an alkanoyloxy group or an alkoxycarbonyl group each of 1–10 carbon atoms.

(4) A liquid crystal composition according to above item (3), wherein the first optically active compound is selected from the group consisting of compounds expressed by general formula (I-b) and the second optically active compound is selected from the group consisting of compounds expressed by any one of general formulas (II-b), (III-b) and (IV-b):

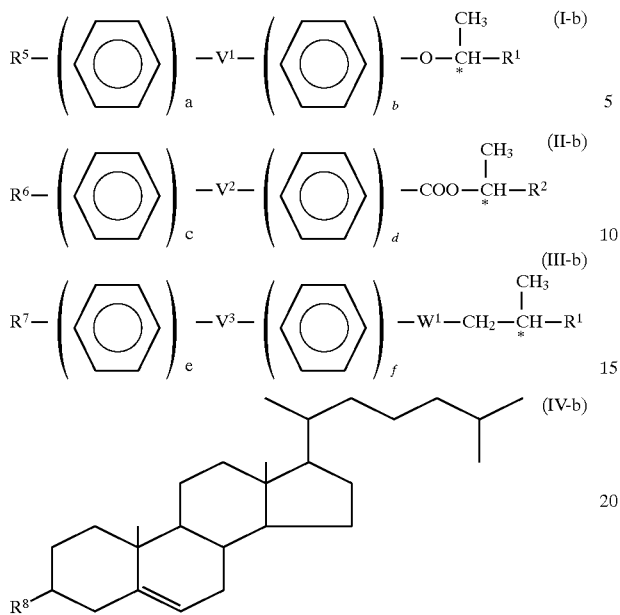

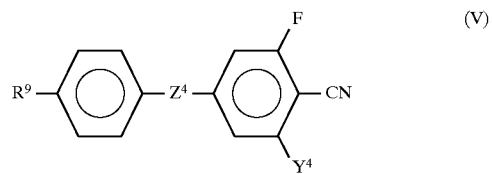

wherein, in formula (I-b), a represents an integer of 0, 1 or 2, b represents an integer of 1 or 2, and (a+b) is 2 or 3; when a=0 $V^1$ represents a single bond and when a is 1 or 2 $V^1$ represents —COO—, —OCO—, —CH$_2$O—, —OCH$_2$— or —CH$_2$CH$_2$—; $R^1$ represents an alkyl group of 2–10 carbon atoms; and $R^5$ represents an alkyl group or an alkoxy group each of 1–10 carbon atoms or a cyano group;

in formula (II-b), c represents an integer of 0, 1 or 2, d represents an integer of 1 or 2, and (c+d) is 2 or 3; when c=0 $V^2$ represents a single bond and when c is 1 or 2 $V^2$ represents —COO—, —OCO—, —CH$_2$O—, —OCH$_2$— or —CH$_2$CH$_2$—; $R^2$ represents an alkyl group of 2–10 carbon atoms; and $R^6$ represents an alkyl group or an alkoxy group each of 1–10 carbon atoms or a cyano group;

in formula (III-b), e represents an integer of 0, 1 or 2, f represents an integer of 1 or 2, and (e+f) is 2 or 3; when e=0 $V^3$ represents a single bond and when e is 1 or 2 $V^3$ represents —COO—, —OCO—, —CH$_2$O—, —OCH$_2$— or —CH$_2$CH$_2$—; $R^3$ represents an alkyl group of 2–10 carbon atoms; and $R^7$ represents an alkyl group or an alkoxy group each of 1–10 carbon atoms or a cyano group;

in formula (IV-b), $R^8$ represents a halogen atom, an alkanoyloxy group or an alkoxycarbonyl group each of 1–10 carbon atoms.

(5) A liquid crystal composition according to above item (2), wherein the first and second optically active compounds are contained in 0.1–10% by weight of the composition.

(6) A liquid crystal composition according to above item (3), wherein the first and second optically active compounds are contained in 0.1–10% by weight of the composition.

(7) A liquid crystal composition according to above item (4), wherein the first and second optically active compounds are contained in 0.1–10% by weight of the composition.

(8) A liquid crystal composition according to any one of items (2) to (7), further comprising an optically inactive component consisting of:

a first optically inactive component consisting of at least one compound selected from the group consisting of compounds expressed by general formula (V):

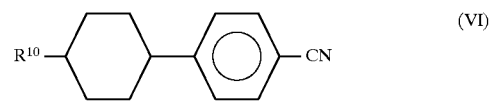

wherein $R^9$ represents an alkyl group, an alkoxy group or an oxaalkyl group each of 1–10 carbon atoms or an alkenyl group of 2–10 carbon atoms; $Z^4$ represents a single bond or —COO—; and $y^4$ represents a hydrogen atom or a fluorine atom, a second optically inactive component consisting of at least one compound selected from the group consisting of compounds expressed by general formula (VI):

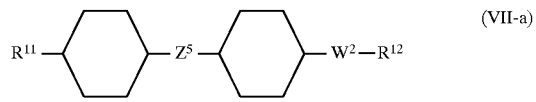

wherein $R^{10}$ represents an alkyl group of 1–10 carbon atoms or an alkenyl group of 2–10 carbon atoms;

a third optically inactive component consisting of at least one compound selected from the group consisting of compounds expressed by any one of general formulas (VII-a), (VII-b) and (VII-c):

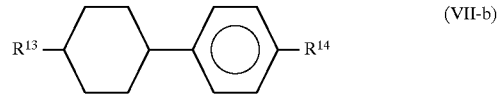

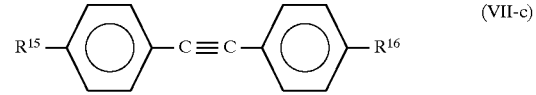

wherein $R^{11}$, $R^{12}$, $R^{13}$, $R^{14}$, $R^{15}$ and $R^{16}$ represent independently an alkyl group or an alkoxy group each of 1–10 carbon atoms or an alkenyl group of 2–10 carbon atoms; and $Z^5$ and $W^2$ represent independently a single bond or —CH=CH—;

a fourth optically inactive component consisting of at least one compound selected from the group consisting of compounds expressed by general formula (VIII-a) or general formula (VIII-b):

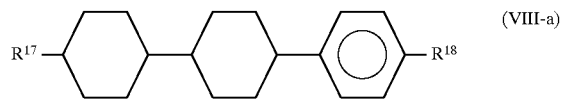

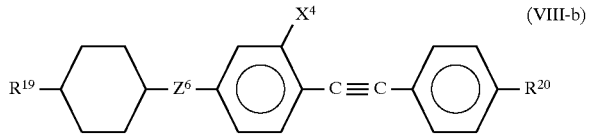

wherein $R^{17}$ and $R^{19}$ represent independently an alkyl group of 1–10 carbon atoms or an alkenyl group of 2–10 carbon atoms; $R^{18}$ represents an alkyl group or an alkoxy group each of 1–10 carbon atoms, a halogen atom or an alkenyl group of 2–10 carbon atoms; $R^{20}$ represents an alkyl group or an alkoxy group each of 1–10 carbon atoms or an alkenyl group of 2–10 carbon atoms; $Z^6$ represents a single bond or —CH$_2$CH$_2$—; and $X^4$ represents a hydrogen atom or a fluorine atom.

(9) A liquid crystal composition according to above item (8), wherein the first optically inactive component consists of at least one compound selected from the group consisting of compounds expressed by formula (V) wherein $R^9$ represents an alkyl group or an oxaalkyl group each of 1–7 carbon atoms, $CH_2=CH-$, $CH_3CH=CH-$, $CH_2=CHCH_2CH_2-$, $CH_3CH_2CH_2CH=CH-$ or $CH_3CH=CHCH_2CH_2-$; $Z^4$ represents a single bond or $-COO-$; $Y^4$ represents a hydrogen atom or a fluorine atom, the second optically inactive component consists of at least one compound selected from the group consisting of compounds expressed by formula (VI) wherein $R^{10}$ represents an alkyl group of 1–7 carbon atoms, $CH2=CH-$, $CH_3CH=CH-$, $CH_2=CHCH_2CH_2-$, $CH_3CH_2CH_2CH=CH-$ or $CH_3CH=CHCH_2CH_2-$, the third optically inactive component consists of at least one compound selected from the group consisting of compounds expressed by formula (VII-a), formula (VII-b) or formula (VII-c) wherein, in formula (VII-a), $W^2$ represents a single bond or $-CH=CH-$; when $W^2$ is a single bond, $R^{11}$ represents an alkyl group or an alkoxy group each of 1–7 carbon atoms, $R^{12}$ represents an alkyl group of 1–7 carbon atoms, $-CH=CH_2$, $-CH=CHCH_3$, $-CH_2CH_2CH=CH_2$, $-CH_2CH_2CH=CHCH_3$, $-CH=CHCH_2CH_3$ or $-CH=CHCH_2CH_2CH_3$, and $Z^5$ represents a single bond or $-CH=CH-$; when $W^2$ is $-CH=CH-$, $R^{11}$ represents an alkyl group or an alkoxy group each of 1–7 carbon atoms, $R^{12}$ represents an alkyl group of 1–7 carbon atoms, and Z5 represents $-CH=CH-$, in formula (VII-b), $R^{13}$ represents an alkyl group of 1–7 carbon atoms, $CH_2=CH-$, $CH_3CH=CH-$, $CH_2=CHCH_2CH_2-$, $CH_3CH_2CH_2CH=CH-$ or $CH_3CH=CHCH_2CH_2-$; $R^{14}$ represents and alkyl group or an alkoxy group each of 1–7 carbon atoms, in formula (VII-c), $R^{15}$ and $R^{16}$ represent independently an alkyl group or an alkoxy group each of 1–7 carbon atoms, $CH_2=CH-$, $CH_3CH=CH-$, $CH_2=CHCH_2CH_2-$, $CH_3CH_2CH_2CH=CH-$ or $CH_3CH=CHCH_2CH_2-$, the fourth optically inactive component consists of at least one compound selected from the group consisting of compounds expressed by formula (VIII-a) or formula (VIII-b) wherein, in formula (VIII-a), $R^{17}$ represents an alkyl group of 1–7 carbon atoms, $CH_2=CH-$, $CH_3CH=CH-$ or $CH_2=CHCH_2CH_2-$; and $R^{18}$ represents an alkyl group or an alkoxy group each of 1–7 carbon atoms or a fluorine atom, in formula (VIII-b), $R^{19}$ and $R^{20}$ represent independently an alkyl group of 1–7 carbon atoms; $Z^6$ represents a single bond or $-CH_2CH_2-$; and $X^4$ represents a hydrogen atom or a fluorine atom.

(10) A liquid crystal composition according to item (8) or item (9), wherein mixing proportions of the first, second, third and fourth optically inactive components are, each by weight, 2–25%, 5–50%, 3–40% and 25–55%, respectively.

The present invention resides in another aspect in (11) A super-twisted nematic mode display device comprising a liquid crystal composition as set forth in any one of above items (1)–(10).

DETAILED DESCRIPTION OF THE PREFERRED EMBODIMENTS

A threshold voltage of a liquid crystal material depends greatly upon a change in helical pitch due to temperature shift. A threshold voltage of a liquid crystal material goes down as temperature goes up. This is caused by an increase in a helical pitch of the LC material due to the temperature rise. A temperature dependence of a threshold voltage of a LC composition may be reduced by adding thereto a mixture of two or more optically active compounds having different signs of a temperature dependence of a helical pitch when added singly to a LC material (Refer to Japanese patent application laid-open No. 63-22893). However, a temperature dependence is more severely effected in STN mode display device wherein a considerably large twist angle of 180–270 degrees is employed, than in conventional TN mode display device wherein a twist angle of 90 degrees is adopted. When a helical pitch P is longer enough than an intrinsic helical pitch $P_0$ (i.e. $P_0<<P$), a so-called undertwisted domain may appear in the STN mode display because of an insufficient size of the twist angle. When a helical pitch P is shorter than an intrinsic helical pitch $P_0$ (i.e. $P_0>>P$), a striped domain may appear to cause a cholesteric layers which form light scattering in display. Hence, display quality may be insufficient. It has therefore been difficult to minimize an effect of a temperature dependence of a helical pitch of a LC material.

It is found by the present inventors that a temperature dependence of a threshold voltage may be reduced without any appearance of the above-mentioned domains by adding to a LC material a mixture of two or more optically active compounds having different signs of a temperature dependance of a helical pitch to adjust a change rate of a helical pitch of the LC material to −0.05 to 0 pm/° C.

An optically active compound which has a negative temperature dependence of a helical pitch and is used in adjusting a temperature dependence of a threshold voltage in the present invention is an optically active compound having a partial chemical structure expressed by general formula (I). More preferred is an optically active compound having a partial chemical structure expressed by general formula (I-a). Far more preferred are those having a partial structure expressed by general formula (I-b). Preferable optically active compounds are mentioned specifically as follows.

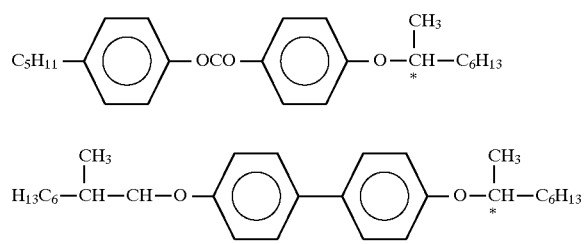

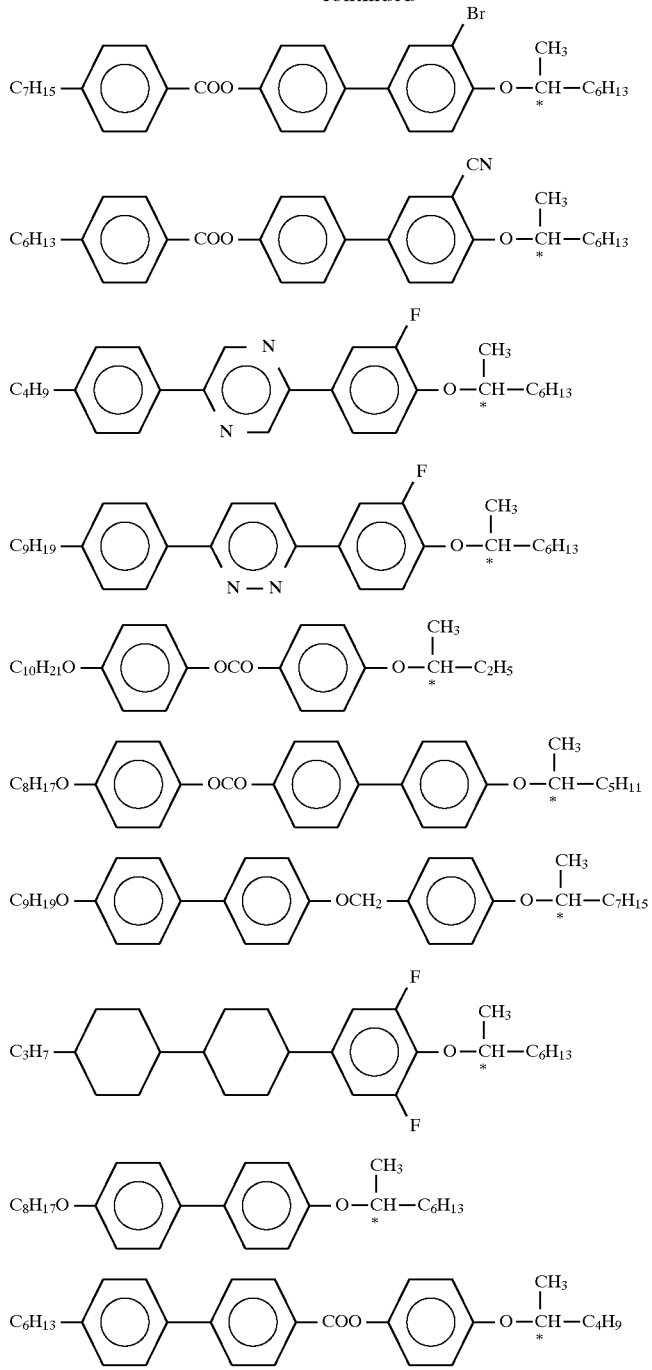

As an optically active compound having the same sign of a helical sense as those of any partial structure of formulas (I), (I-a) and (I-b), and having a positive temperature dependence of a helical pitch, is mentioned a compound having a partial chemical structure expressed by any of above general formulas (II), (III) and (IV). Among those optically active compounds, preferably used in the present invention are those 15 expressed by any of above-mentioned formulas (II-a), (III-a) and (IV-a). A more preferable optically active compound in the present invention is expressed by any of general formulas (II-b), (III-b) and (IV-b). Specific optically active compounds are mentioned below.

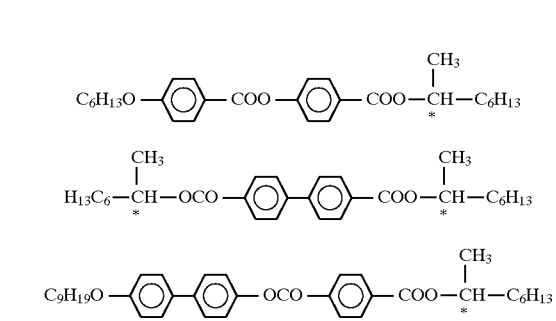

-continued

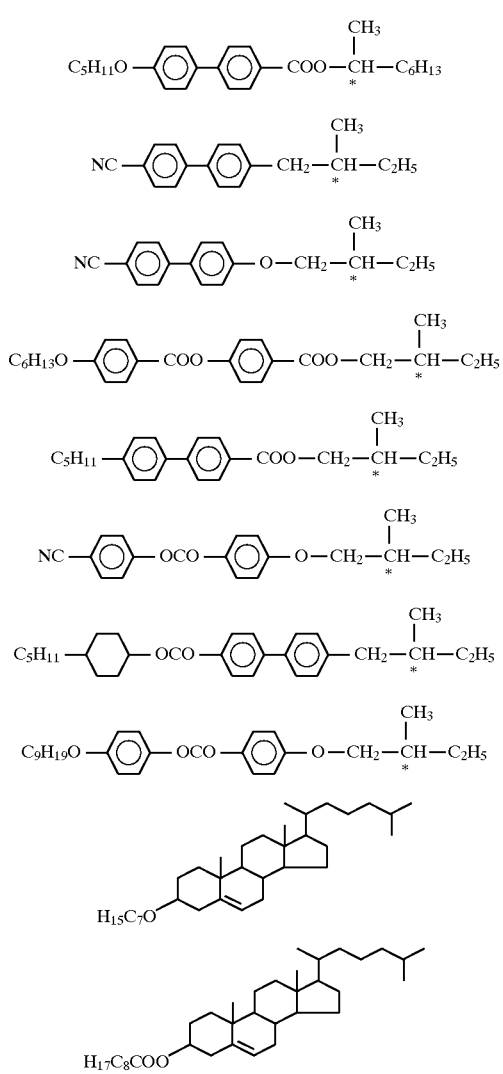

A liquid crystal compound to be used in the present invention other than the above-mentioned optically active compound is not limited as long as the compound shows a nematic phase as a mesomorphic phase. As liquid crystal compounds to be employed in the present invention is mentioned a nematic liquid crystal compound expressed by general formula (IX):

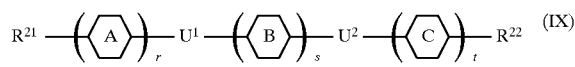

wherein $R^{21}$ represents an alkyl group or an alkoxy group each of 1–12 carbon atoms, or an alkenyl group of 2–12 carbon atoms, in which alkyl, alkoxy and alkenyl groups one or two non-adjacent methylene group(s) may be replaced by —O—; $R^{22}$ represents an alkyl group or an alkoxy group each of 1–12 carbon atoms, an alkenyl group of 2–12 carbon atoms, —F, —Cl, —$CF_3$, —$OCF_3$ or a cyano group; six-membered rings A, B and C represent independently a divalent cyclic hydrocarbon ring of trans-1,4-cyclohexylene or 1,4-phenylene in which one or two hydrogen atom(s) at lateral position thereof may be replaced by F or CN, or a divalent heterocyclic ring of pyrimidin-2,5-diyl, 1,3-dioxan-2,5-diyl, pyridin-2,5-diyl, pyridazin-3,6-diyl or pyrazin-2,5-diyl; U1 and $U^2$ represent independently —COO—, —OCO—, —$CH_2O$—, —$OCH_2$—, —CH=N—, —N=CH—, —$CH_2CH_2$—, —CH=CH—, —C≡C— or a single bond; r and t represent an integer of 0, 1 or 2; s represents an integer of 1 or 2, and (r+s+t) is 2 to 4; $U^1$ is a single bond when r=0, and $U^2$ is a single bond when t=0; with a proviso that two or more rings of A, B and C are not heterocyclic rings simultaneously. It is preferred to use four or more compounds of formula (IX) in the present invention.

Among above-mentioned liquid crystal compounds, those of formulas (V), (VI), (VII-a), (VII-b), (VII-c), (VIII-a) and (VIII-b) are preferred in the present invention, Compounds of formulas (V) and (VI) have a very large positive dielectric anisotropy. By adding these compounds to other LC compounds or compositions it is possible to decrease a threshold voltage of a resulting LC material.

Compounds of formulas (VII-a), (VII-b) and (VII-c) have a very low viscosity. By employing these compounds as a component it becomes possible to reduce a viscosity of a resulting LC material which is accompanied by a rapid electrooptical response.

Compounds of formulas (VIII-a) and (VIII-b) have a comparatively high clearing point. It is possible to raise a clearing point of a resulting LC composition by adding thereto those compounds.

Compounds expressed by formula (VII-c) or formula (VIII-b) have a large optical anisotropy value, and are added to the present composition with an aim of adjusting an optical anisotropy thereof. As specific compounds the following compounds are mentioned.

A mixing proportion of optically active compounds having different signs of temperature dependence of a helical pitch in the present invention is preferred to be so small as to prevent a resulting mixture from being damaged extremely in a clearing point or in other properties. Further, the mixing proportion should not exceed a limit where any precipitate or separation of the optically active compounds from the mixture, and the like undesired phenomena may occur. Thus, a preferable mixing proportion of the optically active compounds is 0.1–10 % by weight of the LC composition.

In addition, a helical pitch of a liquid crystal material at 25° C. is desired to be in a range of 6–15 μm. This is considered from the fact, generally confirmed, that no undertwist domain or striped domain occurs at 25° C. in a D/P margin region (wherein D and P represent a cell thickness and a helical pitch length, respectively) of 0.45–0.7, and the fact that most normally used liquid crystal cell have a thickness in a range of 4–7 μm at present.

The present invention will be illustrated with examples.

A liquid crystal display device is prepared by employing LC composition A consisting of the following compounds including phenylcyclohexane compounds as a main component.

LC composition A:

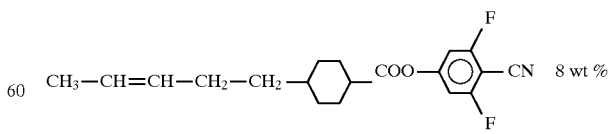

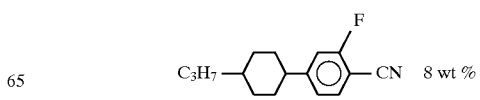

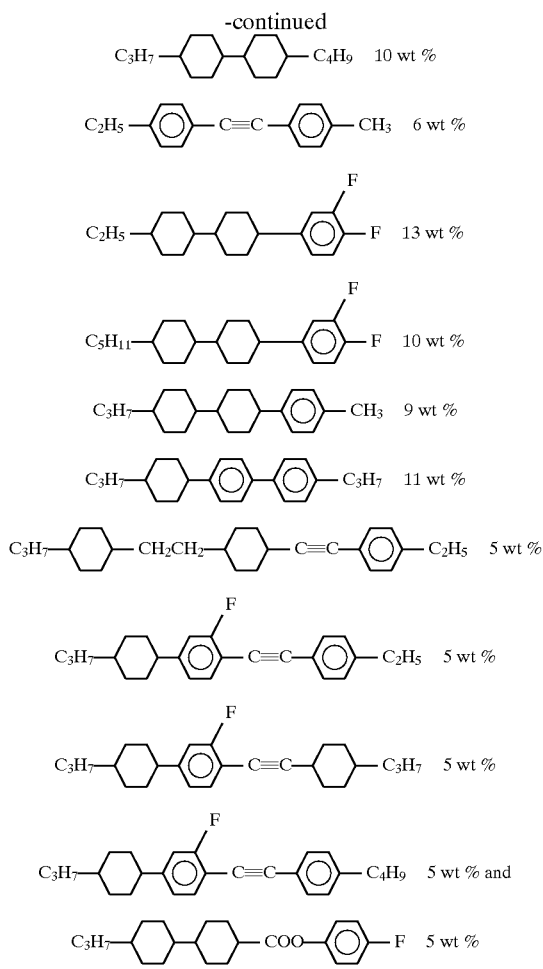

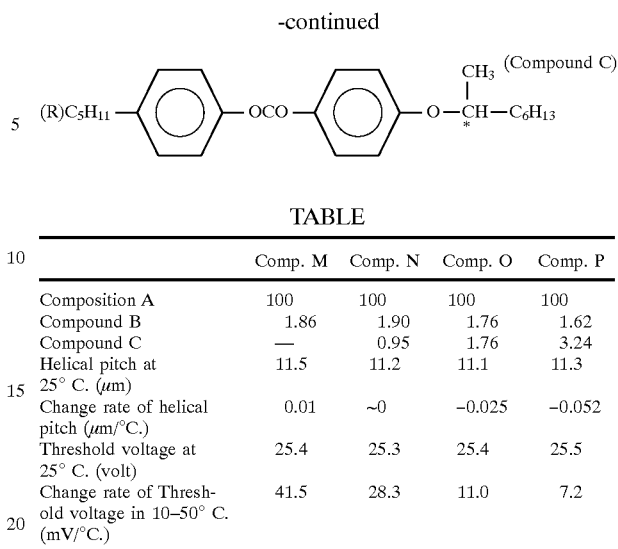

TABLE

|  | Comp. M | Comp. N | Comp. O | Comp. P |
| --- | --- | --- | --- | --- |
| Composition A | 100 | 100 | 100 | 100 |
| Compound B | 1.86 | 1.90 | 1.76 | 1.62 |
| Compound C | — | 0.95 | 1.76 | 3.24 |
| Helical pitch at 25° C. ($\mu$m) | 11.5 | 11.2 | 11.1 | 11.3 |
| Change rate of helical pitch ($\mu$m/°C.) | 0.01 | ~0 | −0.025 | −0.052 |
| Threshold voltage at 25° C. (volt) | 25.4 | 25.3 | 25.4 | 25.5 |
| Change rate of Threshold voltage in 10–50° C. (mV/°C.) | 41.5 | 28.3 | 11.0 | 7.2 |

A helical pitch of each of LC compositions M, N, 0 and P is adjusted to about 11 pm, followed by determining a helical pitch and a threshold voltage at various temperatures between 10 and 50 degrees in centigrade to seek a change rate of a helical pitch and a threshold voltage, results of which are shown in the same Table.

Results in the Table exhibit an inclination that a change rate of threshold voltage decreases as a mixing proportion of compound C increases. Composition P exhibits a striped domain at 50 ° C. and an under-twisted domain at 10 ° C., which results suggest that the change rate of the helical pitch of −0.05 $\mu$m/° C. or lower is undesirable because uneven display due to the above-mentioned domains may occur in case of the lower change rate of the helical pitch below −0.05 pm/° C. even though the change rate of threshold voltage may be decreased.

Thus, it is possible to reduce a change rate of a threshold voltage of a LC composition by adding thereto a pair of optically active compounds having the same helical twist sense and an opposite sign of temperature dependence of the helical pitch to each other. It has also become clear that in order to avoid any undesirable domains in display a temperature change rate of a helical pitch between −0.05 $\mu$m/° C. and 0 $\mu$m/° C. should be required.

More preferable embodiments of the present invention are described in the following items (a) through (d).

(a) A liquid crystal composition for a STN display device having a negative or zero temperature dependence which comprises:

(1) at least four compounds selected from the group consisting of compounds expressed by the above-described formula (IX), (2) at least one optically active compound having a negative temperature dependence of a helical pitch selected from the group consisting of compounds expressed by the above-described formula (I-b), and (3) at least one optically active compound having a positive temperature dependence of a helical pitch selected from the group consisting of compounds expressed by the above-mentioned formula (I(-b) or formula (IV-b), the composition having a change rate of a helical pitch between −0.05 $\mu$m/° C. and 0 $\mu$m/° C. in a temperature range of 10° to 50° C.

(b) A liquid crystal composition according to above item (a), wherein the at least four compounds of formula (IX) are:

at least one compound expressed by the above-described formula (V), at least one compound expressed by the above-described formula (VI), at least one compound selected from the group of compounds expressed by any one of the above-described formulas (VII-a), (VII-b) and (VII-c), and at least one compound selected from the group of compounds expressed by the above-described formula (VIII-a) or formula (VIII-b).

(c) A liquid crystal composition according to above item (b), wherein a mixing proportion of the optically active compound having a negative temperature dependence of a helical pitch is 0.1 to 10 % by weight based upon the total weight of the composition.

(d) A liquid crystal composition according to above item (b), wherein the compound of formula (V), the compound of formula (VI), the compound of any of formulas (VII-a), (VII-b) and (VII-c), the compound of formula (VIII-a) or formula (VIII-b) and the optically active compound having a negative temperature dependence are each contained in, by weight, 2–25%, 5–50%, 3–40%, 25–55% and 0.1–10%, respectively, based upon the total weight of the composition.

EXAMPLES

The present invention will be described by way of examples, but is not construed to be limited thereto. In the examples, a mixing proportion of the components is shown in parts by weight and the following symbols have the meanings defined below.

NI: nematic to isotropic phase transition temperature (° C.)

$\eta_{20}$: viscosity at 20° C. (mPa·s)

$\Delta n$: optical anisotropy at 25° C.

P: a helical pitch at 25° C. ($\mu$m)

dP/dT: change rate of a helical pitch in a temperature range of 10° to 50° C. ($\mu$m/° C.)

$V_{th}$: threshold voltage at 25° C. when driven under a duty ratio of 1/240

$\gamma$: voltage-transmittance characteristics at 25° C., defined by $V_{80}/V_{20}$ wherein $V_{80}$ and $V_{20}$ are applied voltage values when the transmittance proportions are 80 % and 20 %, respectively, of the saturated value $\tau$: electrooptical response time (msec) when driven under 1/240 duty ratio $dV_{th}/dT$: change rate of a threshold voltage in the temperature range of 10 to 50 ° C. (mV/° C.)

D/P: ratio of cell thickness per pitch wherein D means a cell thickness in $\mu$m Example 1

A liquid crystal composition consisting of

| | |
|---|---|
| 3,5-difluoro-4-cyanophenyl 4-(3-pentenyl)benzoate | 8 parts |
| 4-(4-(3-butenyl)cyclohexyl)benzonitrile | 10 parts |
| 1-butyl-4-(4-propylcyclohexyl)cyclohexane | 12 parts |
| 1-ethyl-4-(2-(4-methylphenyl)ethynyl)benzene | 8 parts |
| 1,2-difluoro-4-(4-(4-ethylcyclohexyl)cyclohexyl)benzene | 10 parts |
| 1,2-difluoro-4-(4-(4-propylcyclohexyl)cyclohexyl)benzene | 10 parts |
| 1,2-difluoro-4-(4-(4-pentylcyclohexyl)cyclohexyl)benzene | 10 parts |
| 1-ethyl-4-(2-(2-fluoro-4-(4-propylcyclohexyl)phenyl)ethynyl)benzene | 5 parts |
| 1-ethyl-4-(2-(4-(2-(4-propylcyclohexyl)ethyl)phenyl)ethynyl)benzene | 5 parts |
| 1-propyl-4-(2-(4-(2-(4-propylcyclohexyl)ethyl)phenyl)ethynyl)benzene | 4 parts |
| 1-butyl-4-(2-(4-(2-(4-propylcyclohexyl)ethyl)phenyl)ethynyl)benzene | 4 parts |
| 1-methyl-4-(4-(4-propylcyclohexyl)cyclohexyl)benzene | 6 parts |
| 1-propyl-4-(4-(4-propylcyclohexyl)cyclohexyl)benzene | 8 parts |
| cholesteryl nonanoate | 1.84 parts |
| and | |
| (R) 4-pentylphenyl 4-(1-methylheptyloxy)benzoate | 1.84 parts | was prepared. Physical properties of this composition were obtained as follows.

NI: 98.1° C.

$\eta_{20}$: 26.9 mPa·s $\Delta n$: 0.136

P: 11.1 $\mu$m dP/dT: −0.028 $\mu$m/° C.

By employing this composition, a STN display device having the following parameters is prepared.

Twist angle: 260 degrees

Tilt angle: 4 degrees

D/P: 0.5

D$\Delta n$: 0.82

This STN display device exhibited the following characteristics.

Vth: 25.1 V $\gamma$: 1.047

$\tau$: 244 msec $dV_{th}/dT$: 13.0 mV/° C.

Comparative Example 1

A liquid crystal composition consisting of

| | |
|---|---|
| 3,5-difluoro-4-cyanophenyl 4-(3-pentenyl)benzoate | 8 parts |
| 4-(4-(3-butenyl)cyclohexyl)benzonitrile | 10 parts |
| 1-butyl-4-(4-propylcyclohexyl)cyclohexane | 12 parts |
| 1-ethyl-4-(2-(4-methylphenyl)ethynyl)benzene | 8 parts |
| 1,2-difluoro-4-(4-(4-ethylcyclohexyl)cyclohexyl)benzene | 10 parts |
| 1,2-difluoro-4-(4-(4-propylcyclohexyl)cyclohexyl)benzene | 10 parts |
| 1,2-difluoro-4-(4-(4-pentylcyclohexyl)cyclohexyl)benzene | 10 parts |
| 1-ethyl-4-(2-(2-fluoro-4-(4-propylcyclohexyl)phenyl)ethynyl)benzene | 5 parts |
| 1-ethyl-4-(2-(4-(2-(4-propylcyclohexyl)ethyl)phenyl)ethynyl)benzene | 5 parts |
| 1-propyl-4-(2-(4-(2-(4-propylcyclohexyl)ethyl)phenyl)ethynyl)benzene | 4 parts |
| 1-butyl-4-(2-(4-(2-(4-propylcyclohexyl)ethyl)phenyl ethynyl)benzene | 4 parts |
| 1-methyl-4-(4-(4-propylcyclohexyl)cyclohexyl)benzene | 6 parts |
| 1-propyl-4-(4-(4-propylcyclohexyl)cyclohexyl)benzene | 8 parts |
| and | |
| cholesteryl nonanoate | 1.98 parts | was prepared. Physical properties of this composition were found as follows.

NI: 100.5° C.

$\eta_{20}$: 25.5 mPa·s $\Delta n$: 0.136

P: 11.3 $\mu$m dP/dT: 0.013 μm/° C.

By employing this composition, a STN display device having the following parameters is prepared.

Twist angle: 260 degrees

Tilt angle: 4 degrees

D/P: 0.5

DΔn: 0.82

This STN display device exhibited the following characteristics.

$V_{th}$: 25.4 V

γ: 1.045

τ: 232 msec $dV_{th}/dT$: 47.5 mV/° C.

In addition, there was observed uneven display affected by temperature difference due to local heat caused by the backlight.

Example 2

A liquid crystal composition consisting of

| | |
|---|---|
| 3,5-difluoro-4-cyanophenyl 4-(3-pentenyl)benzoate | 8 parts |
| 4-(4-propylcyclohexyl)benzonitrile | 20 parts |
| 1-butyl-4-(4-propylcyclohexyl)cyclohexane | 11 parts |
| 1-pentyl-4-(4-propylcyclohexyl)cyclohexane | 5 parts |
| 1-ethoxy-4-(4-propylcyclohexyl)benzene | 9 parts |
| 1-ethyl-4-(2-(4-methylphenyl)ethynyl)benzene | 6 parts |
| 1-methyl-4-(4-(4-propylcyclohexyl)cyclohexyl)benzene | 10 parts |
| 1-propyl-4-(4-(4-propylcyclohexyl)cyclohexyl)benzene | 12 parts |
| 1-ethyl-4-(2-(2-fluoro-4-(4-propylcyclohexyl)phenyl)ethnyl)benzene | 7 parts |
| 1-ethyl-4-(2-(4-(2-(4-propylcyclohexyl)ethyl)phenyl)ethynyl)benzene | 4 parts |
| 1-propyl-4-(2-(4-(2-(4-propylcyclohexyl)ethyl)phenyl)ethynyl)benzene | 4 parts |
| 1-butyl-4-(2-(4-(2-(4-propylcyclohexyl)ethyl)phenyl)ethynyl)benzene | 4 parts |
| cholesteryl nonanoate and | 1.72 parts |
| (R) 4-pentylphenyl 4-(1-methylheptyloxy)benzoate | 1.72 parts | was prepared. Physical properties of this composition were obtained as follows.

NI: 86.3° C.

$\eta_{20}$: 22.1 mPa·s

Δn: 0.136

P: 11.2 μm dP/dT: −0.018 μm/° C.

By employing this composition, a STN display device having the following parameters is prepared.

Twist angle: 260 degrees

Tilt angle: 4 degrees

D/P : 0.5

DΔn: 0.82

This STN display device exhibited the following characteristics.

$V_{th}$: 24.3 V

γ1.037

τ: 234 msec $dV_{th}/dT$ 34.5 mV/° C.

In addition, a uniform display was observed without any uneven display.

Comparative Example 2

A liquid crystal composition consisting of

| | |
|---|---|
| 3,5-difluoro-4-cyanophenyl 4-(3-pentenyl)benzoate | 8 parts |
| 4-(4-propylcyclohexyl)benzonitrile | 20 parts |
| 1-butyl-4-(4-propylcyclohexyl)cyclohexane | 11 parts |
| 1-pentyl-4-(4-propylcyclohexyl)cyclohexane | 5 parts |
| 1-ethoxy-4-(4-propylcyclohexyl)benzene | 9 parts |
| 1-ethyl-4-(2-(4-methylphenyl)ethynyl)benzene | 6 parts |
| 1-methyl-4-(4-(4-propylcyclohexyl)cyclohexyl)benzene | 10 parts |
| 1-propyl-4-(4-(4-propylcyclohexyl)cyclohexyl)benzene | 12 parts |
| 1-ethyl-4-(2-(2-fluoro-4-(4-propylcyclohexyl)phenyl)ethnyl)benzene | 7 parts |
| 1-ethyl-4-(2-(4-(2-(4-propylcyclohexyl)ethyl)phenyl)ethynyl)benzene | 4 parts |
| 1-propyl-4-(2-(4-(2-(4-propylcyclohexyl)ethyl)phenyl)ethynyl)benzene | 4 parts |
| 1-butyl-4-(2-(4-(2-(4-propylcyclohexyl)ethyl)phenyl)ethynyl)benzene and | 4 parts |
| cholesteryl nonanoate | 2.08 parts | was prepared. This composition exhibited the following properties.

NI: 90.0° C.

$\eta_{20}$: 120 21.1 mPa·s

Δn: 0.136

P: 11.3 μm dP/dT: 0.018 μm/° C.

By employing this composition, a STN display device having the following parameters is prepared.

Twist angle: 260 degrees

Tilt angle: 4 degrees

D/P: 0.5

DΔn: 0.82

This STN display device exhibited the following characteristics.

$V_{th}$: 24.7 V

γ: 1.036

τ: 216 msec $dV_{th}/dT$: 53.0 mV/° C.

In addition, there was observed uneven display due to local heat caused by the backlight of the display.

Example 3

A liquid crystal composition consisting of

| | |
|---|---|
| 3,5-difluoro-4-cyanophenyl 4-(3-pentenyl)benzoate | 10 parts |
| 4-(4-propylcyclohexyl)benzonitrile | 12 parts |
| 1-butyl-4-(4-propylcyclohexyl)cyclohexane | 4 parts |
| 1-ethyl-4-(2-(4-methylphenyl)ethynyl)benzene | 6 parts |
| 1,2-difluoro-4-(4-(4-ethylcyclohexyl)cyclohexyl)benzene | 10 parts |
| 1,2-difluoro-4-(4-(4-propylcyclohexyl)cyclohexyl)benzene | 13 parts |
| 1-ethyl-4-(2-(4-(2-(4-propylcyclohexyl)ethyl)phenyl)ethynyl)benzene | 6 parts |
| 1-propyl-4-(2-(4-(2-(4-propylcyclohexyl)ethyl)phenyl)ethynyl)benzene | 5 parts |
| 1-butyl-4-(2-(4-(2-(4-propylcyclohexyl)ethyl)phenyl)ethynyl)benzene | 5 parts |
| 1-methyl-4-(4-(4-propylcyclohexyl)cyclohexyl)benzene | 10 parts |
| 1-propyl-4-(4-(4-propylcyclohexyl)cyclohexyl)benzene | 14 parts |
| 4-fluorophenyl 4-(4-propylcyclohexyl)cyclohexanecarboxylate | 5 parts |

-continued

| | |
|---|---|
| cholesteryl nonanoate | 1.85 parts |
| and | |
| (R) 4-pentylphenyl 4-(1-methylheptyloxy)benzoate | 1.85 parts | was prepared. This composition exhibited the following properties.

NI: 107.1° C.

$\eta_{20}$: 20 32.0 mPa·s $\Delta$n: 0.136

P: 11.1 $\mu$m dP/dT: −0.028 $\mu$m/° C.

Example 4

A liquid crystal composition consisting of

| | |
|---|---|
| 3,5-difluoro-4-cyanophenyl 4-(3-pentenyl)benzoate | 10 parts |
| 4-(4-propylcyclohexyl)benzonitrile | 12 parts |
| 1-butyl-4-(4-propylcyclohexyl)cyclohexane | 4 parts |
| 1-ethyl-4-(2-(4-methylphenyl)ethynyl)benzene | 6 parts |
| 1,2-difluoro-4-(4-(4-ethylcyclohexyl)cyclohexyl)benzene | 10 parts |
| 1,2-difluoro-4-(4-(4-propylcyclohexyl)cyclohexyl)benzene | 13 parts |
| 1-ethyl-4-(2-(4-(2-(4-propylcyclohexyl)ethyl)phenyl)ethynyl)benzene | 6 parts |
| 1-propyl-4-(2-(4-(2-(4-propylcyclohexyl)ethyl)phenyl)ethynyl)benzene | 5 parts |
| 1-butyl-4-(2-(4-(2-(4-propylcyclohexyl)ethyl)phenyl)ethynyl)benzene | 5 parts |
| 1-methyl-4-(4-(4-propylcyclohexyl)cyclohexyl)benzene | 10 parts |
| 1-propyl-4-(4-(4-propylcyclohexyl)cyclohexyl)benzene | 14 parts |
| 4-fluorophenyl 4-(4-propylcyclohexyl)cyclohexane-carboxylate | 5 parts |
| cholesteryl nonanoate | 1.89 parts |
| and | |
| (R) 4-pentylphenyl 4-(1-methylheptyloxy)benzoate | 1.26 parts | was prepared. This composition exhibited the following properties.

NI: 107.4° C.

$\eta_{20}$: 32.3 mPa·s $\Delta$n: 0.136

P: 11.5 $\mu$m dP/dT: −0.023 $\mu$m/° C.

Comparative Example 3

A liquid crystal composition consisting of

| | |
|---|---|
| 3,5-difluoro-4-cyanophenyl 4-(3-pentenyl)benzoate | 10 parts |
| 4-(4-propylcyclohexyl)benzonitrile | 12 parts |
| 1-butyl-4-(4-propylcyclohexyl)cyclohexane | 4 parts |
| 1-ethyl-4-(2-(4-methylphenyl)ethynyl)benzene | 6 parts |
| 1,2-difluoro-4-(4-(4-ethylcyclohexyl)cyclohexyl)benzene | 10 parts |
| 1,2-difluoro-4-(4-(4-propylcyclohexyl)cyclohexyl)benzene | 13 parts |
| 1-ethyl-4-(2-(4-(2-(4-propylcyclohexyl)ethyl)phenyl)ethynyl)benzene | 6 parts |
| 1-propyl-4-(2-(4-(2-(4-propylcyclohexyl)ethyl)phenyl)ethynyl)benzene | 5 parts |
| 1-butyl-4-(2-(4-(2-(4-propylcyclohexyl)ethyl)phenyl)ethynyl)benzene | 5 parts |
| 1-methyl-4-(4-(4-propylcyclohexyl)cyclohexyl)benzene | 10 parts |
| 1-propyl-4-(4-(4-propylcyclohexyl)cyclohexyl)benzene | 14 parts |
| 4-fluorophenyl 4-(4-propylcyclohexyl)cyclohexane-carboxylate | 5 parts |
| and | |
| cholesteryl nonanoate | 2.03 parts | was prepared. This composition exhibited the following properties.

NI: 109.3° C.

$\eta_{20}$: 30.6 mPa·s $\Delta$n: 0.136

P: 11.6 $\mu$m dP/dT: 0.008 $\mu$m/ C.

Example 5

A liquid crystal composition consisting of

| | |
|---|---|
| 3,5-difluoro-4-cyanophenyl 4-(3-pentenyl)benzoate | 6 parts |
| 4-(4-propylcyclohexyl)benzonitrile | 19 parts |
| 4-(4-(3-pentenyl)cyclohexyl)benzonitrile | 13 parts |
| 1-butyl-4-(4-propylcyclohexyl)cyclohexane | 6 parts |
| 1-methyl-4-(4-(4-ethylcyclohexyl)cyclohexyl)benzene | 4 parts |
| 1-methyl-4-(4-(4-propylcyclohexyl)cyclohexyl)benzene | 10 parts |
| 1-propyl-4-(4-(4-propylcyclohexyl)cyclohexyl)benzene | 15 parts |
| 1-methoxy-4-(4-(4-propylcyclohexyl)cyclohexyl)benzene | 4 parts |
| 4-fluorophenyl 4-(4-propylcyclohexyl)cyclohexane-carboxylate | 7 parts |
| 4'-(4-propylcyclohexyl)-4-fluorobiphenyl | 8 parts |
| 4'-(4-pentylcyclohexyl)-4-fluorobiphenyl | 5 parts |
| 1-ethyl-4-(2-(4-(2-(4-propylcyclohexyl)ethyl)phenyl)ethynyl)benzene | 3 parts |
| cholesteryl nonanoate | 1.89 parts |
| and | |
| (R) 4-pentylphenyl 4-(1-methylheptyloxy)benzoate | 0.95 part | was prepared. This composition exhibited the following properties.

NI: 106.8° C.

$\eta_{20}$: 31.9 mPa·s $\Delta$n: 0.124

P: 13.0 $\mu$m dP/dT: −0.013 $\mu$m/° C.

By employing this composition, a STN display device having the following parameters is prepared.

Twist angle: 250 degrees

Tilt angle: 4 degrees

D/P: 0.5

D$\Delta$n: 0.75

This STN display device exhibited the following characteristics.

$V_{th}$: 24.9 V $\gamma$: 1.042

$\tau$: 218 msec d$V_{th}$/dT: 30.0 mV/° C.

In addition, a display was found uniform with no uneven display.

Comparative Example 4

A liquid crystal composition consisting of

| | |
|---|---|
| 3,5-difluoro-4-cyanophenyl 4-(3-pentenyl)benzoate | 6 parts |
| 4-(4-propylcyclohexyl)benzonitrile | 19 parts |

-continued

| | |
|---|---|
| 4-(4-(3-pentenyl)cyclohexyl)benzonitrile | 13 parts |
| 1-butyl-4-(4-propylcyclohexyl)cyclohexane | 6 parts |
| 1-methyl-4-(4-(4-ethylcyclohexyl)cyclohexyl)benzene | 4 parts |
| 1-methyl-4-(4-(4-propylcyclohexyl)cyclohexyl)benzene | 10 parts |
| 1-propyl-4-(4-(4-propylcyclohexyl)cyclohexyl)benzene | 15 parts |
| 1-methoxy-4-(4-(4-propylcyclohexyl)cyclohexyl)benzene | 4 parts |
| 4-fluorophenyl 4-(4-propylcyclohexyl)cyclohexane-carboxylate | 7 parts |
| 4'-(4-propylcyclohexyl)-4-fluorobiphenyl | 8 parts |
| 4'-(4-pentylcyclohexyl)-4-fluorobiphenyl | 5 parts |
| 1-ethyl-4-(2-(4-(2-(4-propylcyclohexyl)ethyl)phenyl)ethynyl)benzene and | 3 parts |
| cholesteryl nonanoate | 2.31 parts | was prepared. This composition exhibited the following properties.

NI: 107.3° C.

$\eta_{20}$: 30.4 mPa·s $\Delta n$: 0.124

P: 12.2 $\mu$m dP/dT: 0.018 $\mu$m/° C.

By employing this composition, a STN display device having the following parameters is prepared.

Twist angle: 250 degrees

Tilt angle: 4 degrees

D/P: 0.5

D$\Delta n$: 0.75

This STN display device exhibited the following characteristics.

$V_{th}$: 24.4 V $\gamma$: 1.041

$\tau$: 207 msec $dV_{th}/dT$: 55.0 mV/° C.

In addition, there was observed uneven display due to the backlight in the display area.

Example 6

A liquid crystal composition consisting of

| | |
|---|---|
| 3,5-difluoro-4-cyanophenyl 4-(3-pentenyl)benzoate | 3 parts |
| 4-(4-propylcyclohexyl)benzonitrile | 22 parts |
| 4-(4-(3-butenyl)cyclohexyl)benzonitrile | 9 parts |
| 4-(4-(3-pentenyl)cyclohexyl)benzonitrile | 9 parts |
| 1-butyl-4-(4-propylcyclohexyl)cyclohexane | 11 parts |
| 1-fluoro-4-(4-(4-propylcyclohexyl)cyclohexyl)benzene | 5 parts |
| 1-methyl-4-(4-(4-propylcyclohexyl)cyclohexyl)benzene | 10 parts |
| 1-propyl-4-(4-(4-propylcyclohexyl)cyclohexyl)benzene | 16 parts |
| 1-methoxy-4-(4-(4-propylcyclohexyl)cyclohexyl)benzene | 4 parts |
| 1-ethyl-4-(2-(4-(2-(4-propylcyclohexyl)ethyl)phenyl)ethynyl)benzene | 4 parts |
| 1-propyl-4-(2-(4-(2-(4-propylcyclohexyl)ethyl)phenyl)ethynyl)benzene | 4 parts |
| 1-butyl-4-(2-(4-(2-(4-propylcyclohexyl)ethyl)phenyl)ethynyl)benzene | 3 parts |
| (S) 4-(1-methylheptyloxycarbonyl)phenyl 4-hexyloxybenzoate and | 0.71 part |
| (R) 4-pentylphenyl 4-(1-methylheptyloxy)benzoate | 1.00 part | was prepared. This composition exhibited the following properties.

NI: 98.7° C.

$\eta_{20}$: 28.8 mPa·s $\Delta n$: 0.125

P: 13.2 $\mu$m dP/dT: −0.026 $\mu$m/° C.

By employing this composition, a STN display device having the following parameters is prepared.

Twist angle: 250 degrees

Tilt angle: 4 degrees

D/P: 0.5

D$\Delta n$: 0.75

This STN display device exhibited the following characteristics.

$V_{th}$: 24.8 V $\gamma$: 1.045

$\tau$: 191 msec $dV_{th}/dT$ 30.0 mV/° C.

In addition, no uneven display was found in the total display area.

Comparative Example 5

A liquid crystal composition consisting of

| | |
|---|---|
| 3,5-difluoro-4-cyanophenyl 4-(3-pentenyl)benzoate | 3 parts |
| 4-(4-propylcyclohexyl)benzonitrile | 22 parts |
| 4-(4-(3-butenyl)cyclohexyl)benzonitrile | 9 parts |
| 4-(4-(3-pentenyl)cyclohexyl)benzonitrile | 9 parts |
| 1-butyl-4-(4-propylcyclohexyl)cyclohexane | 11 parts |
| 1-fluoro-4-(4-(4-propylcyclohexyl)cyclohexyl)benzene | 5 parts |
| 1-methyl-4-(4-(4-propylcyclohexyl)cyclohexyl)benzene | 10 parts |
| 1-propyl-4-(4-(4-propylcyclohexyl)cyclohexyl)benzene | 16 parts |
| 1-methoxy-4-(4-(4-propylcyclohexyl)cyclohexyl)benzene | 4 parts |
| 1-ethyl-4-(2-(4-(2-(4-propylcyclohexyl)ethyl)phenyl)ethynyl)benzene | 4 parts |
| 1-propyl-4-(2-(4-(2-(4-propylcyclohexyl)ethyl)phenyl)ethynyl)benzene | 4 parts |
| 1-butyl-4-(2-(4-(2-(4-propylcyclohexyl)ethyl)phenyl)ethynyl)benzene and | 3 parts |
| (S) 4-(1-methylheptyloxycarbonyl)phenyl 4-hexyloxybenzoate | 1.14 parts | was prepared. This composition exhibited the following properties.

NI: 100.0° C.

$\eta_{20}$: 27.6 mPa·s $\Delta n$: 0.125

P: 12.1 $\mu$m dP/dT: 0.023 $\mu$m/° C.

By employing this composition, a STN display device having the following parameters is prepared.

Twist angle: 250 degrees

Tilt angle: 4 degrees

D/P 0.5

D$\Delta n$: 0.75

This STN display device exhibited the following characteristics.

$V_{th}$: 25.8 V $\gamma$: 1.047

$\tau$: 156 msec $dV_{th}/dT$: 65.0 mV/° C.

In addition, uneven display due to the backlight was observed in the display area.

As shown in the above examples, a liquid crystal composition having a steep electrooptical characteristics, a low viscosity, and yet a small temperature dependence of a threshold voltage is produced by the present invention. It has become possible to produce a STN mode display device having a high contrast with no uneven display and rapid electrooptical response by employing the composition.

What is claimed is:

1. A liquid crystal composition for a supertwisted nematic mode display device comprising:

at least one first optically active compound having a negative temperature dependence of a cholesteric helical pitch induced when added singly to a nematic liquid crystal, and at least one second optically active compound having the same helical sense to said first optically active compound and a positive temperature dependence of a cholesteric helical pitch induced when added singly to a nematic liquid crystal, wherein the composition has a helical pitch at 25° C. of 6 to 15 μm, a negative temperature dependence of a helical pitch and a rate of change of a helical pitch of −0.05 to 0 μm/°C. between 10° C. and 50° C.; said first optically active compound is selected from the group consisting of compounds expressed by a general formula (I-b); said second optically active compound is selected from the group consisting of compounds expressed by general formula (II-b), (III-b) and (IV-b); and wherein said first and second optically active compounds are contained in 0.1–10% by weight of said composition,

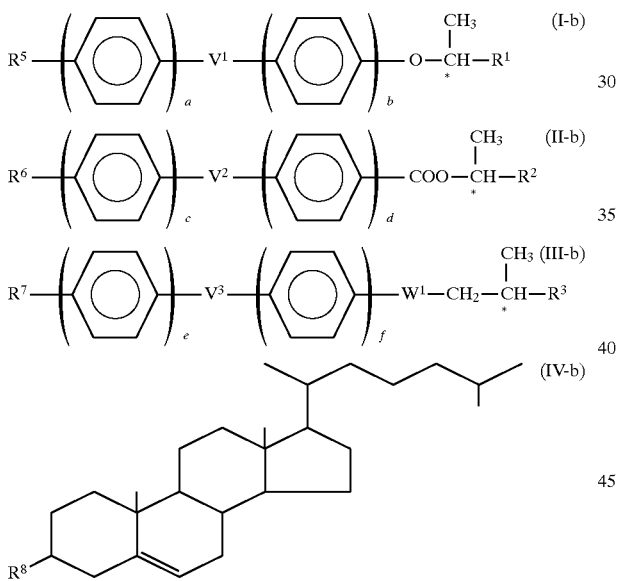

wherein, in formula (I-b), a represents an integer of 0, 1 or 2, b represents an integer of 1 or 2, and (a+b) is 2 or 3; when a=0 $V^1$ represents a single bond and when a is 1 or 2 $V^1$ represents —COO—, —OCO—, —CH$_2$O—, —OCH$_2$— or —CH$_2$CH$_2$—; $R^1$ represents an alkyl group of 2–10 carbon atoms; and $R^5$ represents an alkyl group or an alkoxy group each of 1–10 carbon atoms or a cyano group;

in formula (II-b), c represents an integer of 0, 1 or 2, d represents an integer of 1 or 2, and (c+d) is 2 or 3; when c=0 $V^2$ represents a single bond and when c is 1 or 2 $V^2$ represents —COO—, —OCO—, —CH$_2$O—, —OCH$_2$— or —CH$_2$CH$_2$—; $R^2$ represents an alkyl group of 2–10 carbon atoms; and $R^6$ represents an alkyl group or an alkoxy group each of 1–10 carbon atoms or a cyano group;

in formula (III-b), e represents an integer of 0, 1 or 2, f represents an integer of 1 or 2, and (e+f) is 2 or 3; when e=0 $V^3$ represents a single bond and when e is 1 or 2 $V^3$ represents —COO—, —OCO—, —CH$_2$O—, —OCH$_2$— or —CH$_2$CH$_2$—; $R^3$ represents an alkyl group of 2–10 carbon atoms; and $R^7$ represents an alkyl group or an alkoxy group each of 1–10 carbon atoms or a cyano group; and in formula (IV-b), $R^8$ represents a halogen atom, an alkanoyloxy group or an alkoxycarbonyl group each of 1–10 carbon atoms, said composition further comprising an optically inactive component consisting of:

a first optically inactive component consisting of at least one compound selected from the group consisting of compounds expressed by formula (V):

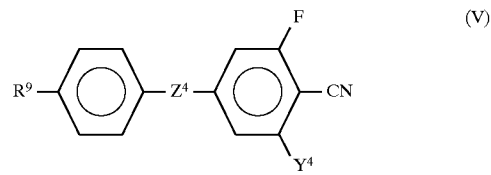

wherein $R^9$ represents an alkyl group or an oxaalkyl group each of 1–7 carbon atoms, CH$_2$=CH—, CH$_3$CH=CH—, CH$_2$=CHCH$_2$CH$_2$—, CH$_3$CH$_2$CH$_2$CH=CH— or CH$_3$CH=CHCH$_2$CH$_2$—; $Z^4$ represents a single bond or —COO—; and $y^4$ represents a hydrogen atom or a fluorine atom, a second optically inactive component consisting of at least one compound selected from the group consisting of compounds expressed by formula (VI):

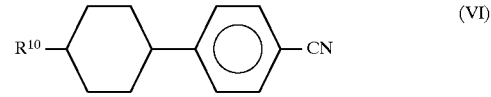

wherein $R^{10}$ represents an alkyl group of 1–7 carbon atoms, CH$_2$=CH—, CH$_3$CH=CH—, CH$_2$=CHCH$_2$CH$_2$—, CH$_3$CH$_2$CH$_2$CH=CH— or CH$_3$CH=CHCH$_2$CH$_2$—, a third optically inactive component consisting of at least one compound selected from the group consisting of compounds expressed by any one of formulas (VII-a), (VII-b) and (VII-c):

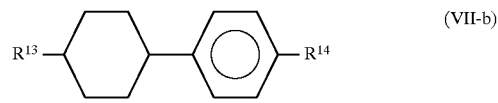

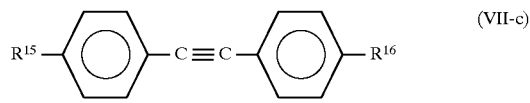

wherein, in formula (VII-a), $W^2$ represents a single bond or —CH=CH—; when $W^2$ is a single bond, $R^{11}$ represents an alkyl group or an alkoxy group each of 1–7 carbon atoms, $R^{12}$ represents an alkyl group of 1–7 carbon atoms, —CH=CH$_2$, —CH=CHCH$_3$, —CH$_2$CH$_2$CH=CH$_2$, —CH$_2$CH$_2$CH=CHCH$_3$, —CH=CHCH$_2$CH$_3$ or —CH=CHCH$_2$CH$_2$CH$_3$, and $Z^5$ represents a single bond or —CH=CH—; when $W^2$ is —CH=CH—, $R^{11}$ represents an alkyl group or an alkoxy group each of 1–7 carbon atoms, $R^{12}$ represents an alkyl group of 1–7 carbon atoms, and $Z^5$ represents —CH=CH—, in formula (VII-b), $R^{13}$ represents an alkyl group of 1–7 carbon atoms, $CH_2$=CH—, $CH_3CH$=CH—, $CH_2$=$CHCH_2CH_2$—, $CH_3CH_2CH_2CH$=CH— or $CH_3CH$=$CHCH_2CH_2$—; $R^{14}$ represents an alkyl group or an alkoxy group each of 1–7 carbon atoms, in formula (VII-c), $R^{15}$ and $R^{16}$ represent independently an alkyl group or an alkoxy group each of 1–7 carbon atoms, $CH_2$=CH—, $CH_3CH$=CH—, $CH_2$=$CHCH_2CH_2$—, $CH_3CH_2CH_2CH$=CH— or $CH_3CH$=$CHCH_2CH_2$—;

a fourth optically inactive component consisting of at least one compound selected from the group consisting of compounds expressed by formula (VIII-a) and (VIII-b):

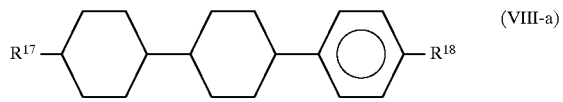
(VIII-a)

-continued

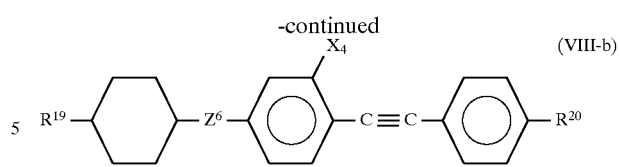
(VIII-b)

wherein, in said formula (VIII-a), $R^{17}$ represents an alkyl group of 1–7 carbon atoms, $CH_2$=CH—, $CH_3CH$=CH— or $CH_2$=$CHCH_2CH_2$—; and $R^{18}$ represents an alkyl group or an alkoxy group each of 1–7 carbon atoms or a fluorine atom, in said formula (VIII-b), $R^{19}$ and $R^{20}$ represent independently an alkyl group of 1–7 carbon atoms; $Z^6$ represents a single bond or —$CH_2CH_2$—; and $X^4$ represents a hydrogen atom or a fluorine atom, wherein mixing proportions of said first, second, third and fourth optically inactive components are, each by weight, 2–25%, 5–50%, 3–40% and 25–55%, respectively.

2. A liquid crystal display device comprising a liquid crystal composition as set forth in claim 1.

* * * * *

UNITED STATES PATENT AND TRADEMARK OFFICE
CERTIFICATE OF CORRECTION

PATENT NO. : 5,807,499

DATED : September 15, 1998

INVENTOR(S) : Terashima et al.

It is certified that error appears in the above-identified patent and that said Letters Patent is hereby corrected as shown below:

On the title page, insert item [30] Foreign Application Priority Data
-- Aug. 23, 1995 [JP]  Japan..............................7-237691 --.

Signed and Sealed this

Twenty-third Day of February, 1999

Attest:

Q. TODD DICKINSON

Attesting Officer

Acting Commissioner of Patents and Trademarks